Figure 1:
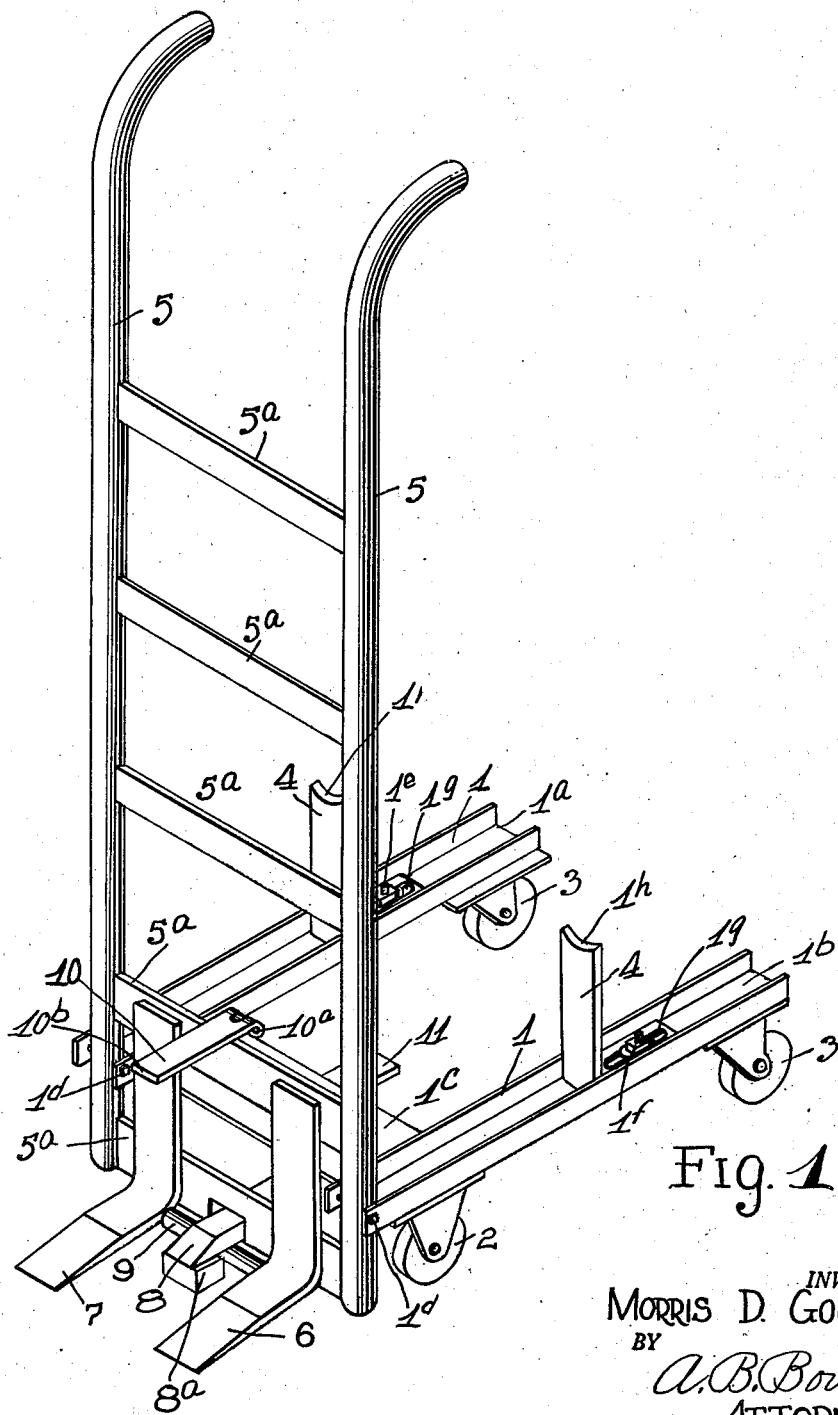

April 16, 1946.  M. D. GOODRICH  2,398,584
HEAVY DUTY HAND TRUCK
Filed Aug. 21, 1944  2 Sheets-Sheet 1

INVENTOR.
MORRIS D. GOODRICH
BY
A. B. Bowman
ATTORNEY

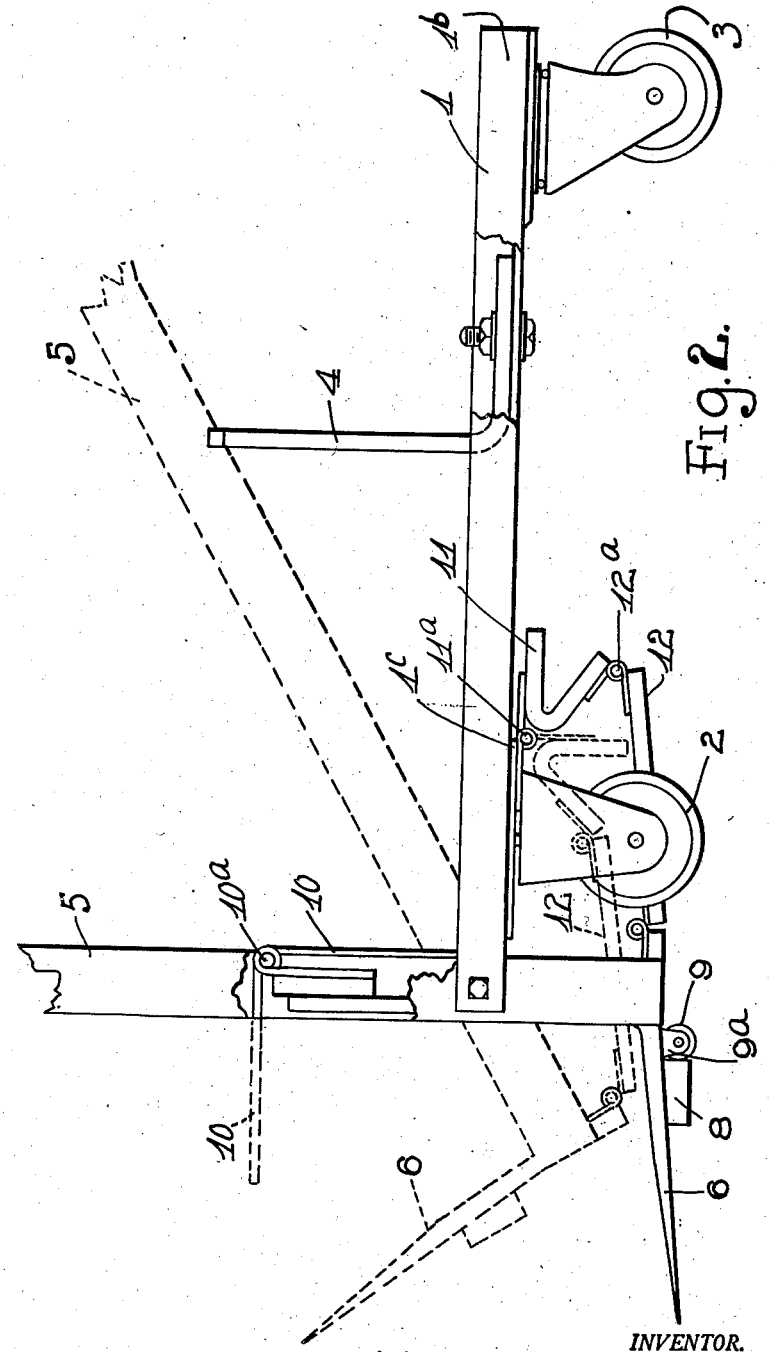

Patented Apr. 16, 1946

2,398,584

UNITED STATES PATENT OFFICE 2,398,584

HEAVY-DUTY HAND TRUCK

Morris D. Goodrich, San Diego, Calif.

Application August 21, 1944, Serial No. 550,364

4 Claims. (Cl. 214—65)

My invention relates to a heavy duty hand truck, more particularly for use in manually moving heavy objects such as large trunks, heavy boxes, or the like, and the objects of my invention are:

First, to provide a hand truck of this class which is very maneuverable and which does not burden the operator thereof with any vertical load;

Second, to provide a hand truck of this class with novel load elevating means to facilitate loading operations thereof;

Third, to provide a hand truck of this class with novel means arranged to assist the unloading thereof;

Fourth, to provide a hand truck of this class of the movable lift type having four wheels arranged to carry the entire vertical load;

Fifth, to provide a hand truck of this class which is adapted to carry the entire vertical load on four wheels and which is open at the rear side permitting the operator to stand forwardly of the rear wheels and tiltably lift the load in order to bring the same to bear on the said four wheels; and Sixth, to provide a hand truck of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a perspective view of my heavy duty hand truck and Fig. 2 is an enlarged fragmentary side elevational view thereof showing portions broken away to facilitate the illustration and showing by dash lines the tiltable relationship of the handle and pick up prong with the frame.

Similar characters of reference refer to similar parts and portions throughout the several views of the drawings:

The truck frame 1, wheels 2 and 3, handle support 4, handle 5, prongs 6 and 7, wedge 8, rollers 9, lever 10, foot pedal 11 and the link 12 constitutes the principal parts and portions of my heavy duty hand truck.

The truck frame 1 consists of two channel members 1a and 1b interconnected at their forward ends by a cross member 1c. It will be noted that the truck frame 1 is open at its rear end permitting the entrance of the operator thereof between the channel members 1a and 1b. The truck frame 1 is supported on stationary wheels 2 at the front ends of the channel members 1a and 1b and the swivel casters 3 support the channel members 1a and 1b at their rear ends.

Pivotally mounted in connection with the front ends of the channels members 1a and 1b by bolts 1d are the handle members 5. These handle members 5 are interconnected by cross members 5a, and secured to one of these cross members 5a is the lever 10 pivotally mounted on a pin 10a. Rigidly secured to the lower cross members 5a are the substantially L-shaped prongs 6 and 7 intermediate of which the roller 9 is rigidly mounted. As shown in Fig. 2 of the drawings, the bearing 9a is secured to the lower side of the prong 6. A similar bearing is provided in connection with the prong 7 providing a rigid support for the roller 9. The wedge 8 is reciprocally mounted transversely of the axis of the roller 9 and the wedge 8 is supported on the upper side of the roller 9, as shown best in Fig. 1 of the drawings.

Rigidly secured to the lower side of this wedge 8 at the forward end thereof is a block 8a which forms a stop against the roller 9. Pivotally connected to the rear end of the wedge 8 is the link 12 which is pivotally connected to the substantially V-shaped foot pedal by the hinge 12a, as shown best in Fig. 2 of the drawings. This foot pedal 11 is pivotally secured to the cross member 1c of the frame 1 by the hinge 11a.

The handle supports 4 are substantially L-shaped members and are secured on the upper sides of the channel members 1a and 1b by bolts 1e and 1f. It will be noted that the horizontal leg of each of these handle supports 4 is provided with a longitudinally slotted portion 1g for forward or backward adjustment of the handle supports 4 when adjusting the supported angle of the handle 5 to the desired condition. The upper ends of the handle supports 4 are provided with arcuate recesses 1h, as shown best in Fig. 1 of the drawings.

The operation of my heavy duty hand truck is substantially as follows: When it is desired by the operator thereof to pick up and move a heavy box or the like, the operator forces the prongs 6 and 7 underneath the box to be moved and the foot pedal 11 may be depressed in order to force the wedge 8 beneath the box and assist in tilting the same so that the prongs 6 and 7 may be completely inserted under the lower side of the box. It will be noted that when the wedge 8 is forced outwardly by the pressure on the foot pedal 11, the foot pedal 11 and the link 12 shift forwardly, and the roller 9 supports the wedge 8 at its lower side. After the operator has the heavy box well placed on the prongs 6 and 7, he shifts the handles 5 backwardly until they rest upon the handle support 4 in the arcuate recess portions 1h so that the center of gravity of the load is placed intermediate the front wheels 2 and the rear caster wheels 3 to relieve the operator of any vertical load such as might be imposed by the operation of a wheelbarrow or the like. With the entire load resting on the four wheels under the truck frame 1, the operator pushes the truck 1 by the handles 5. When it is desired to maneuver and turn the truck 1, lateral pressure is exerted on the handles 5 and the caster wheels 3 at the rear of the truck frame 1 turn providing very maneuverable operations of my heavy duty hand truck. When the operator arrives at the destination of the load carried on the hand truck, he pivotally shifts the handles 5 upwardly until in the vertical position, as shown in Fig. 1 of the drawings. The lever 10 is then shifted into position engaging the box or other object resting on the prongs 6 and 7. The end portion 10b of the lever 10 engages the back side of the box and the operator then tilts the handles 5 back and forth whereby the end 10b of the lever shifts downwardly behind the box assisting in the removal of the box from the prongs 6 and 7. It will be here noted that when the handles 5 are in the upward position, the operator may stand intermediate the channel members 1a and 1b in convenient position.

Though I have shown and described a particular construction, combination and arrangement of parts and portions, I do not wish to be limited to the particular construction, combination and arrangement but desire to include in the scope of my invention the construction, combination and arrangement substantially as set forth in the appended claims.

Having thus described my invention, what I claim as new and desire to secure by Letters Patent is:

1. In a hand truck of the class described, the combination of a substantially U-shaped frame open at its rear end and forming a pair of backwardly extending members each having an upwardly extending handle engaging member, wheels supporting said frame, handle members pivotally mounted on the front end of said frame, angularly extending prongs secured to said handle, handle supports on said frame arranged to support said handles when pivotally shifted backwardly and downwardly toward said frame, and a lever pivotally mounted above said prongs and shiftable forwardly and outwardly engageable with objects resting on said prongs.

2. In a hand truck of the class described, the combination of a frame, handles pivotally connected to the front end of said frame, wheels for supporting said frame, angularly extending prongs secured to said handle and a reciprocally mounted wedge intermediate said handle and movable forwardly slightly above the upper surfaces of said prongs.

3. In a hand truck of the class described, the combination of a frame, handles pivotally connected to the front end of said frame, wheels for supporting said frame, angularly extending prongs secured to said handles, a reciprocally mounted wedge intermediate said handle and movable forwardly slightly above the upper surfaces of said prongs, roller means supporting the lower side of said wedge and a foot pedal connected with said wedge and arranged to pivotally shift the same outwardly toward the ends of said prong.

4. In a hand truck of the class described, the combination of a frame, handles pivotally connected to the front end of said frame, wheels for supporting said frame, angularly extending prongs secured to said handles, a reciprocally mounted wedge intermediate said handle and movable forwardly slightly above the upper surface of said prongs, roller means supporting the lower side of said wedge, a foot pedal connected with said wedge and arranged to pivotally shift the same outwardly toward the ends of said prongs, and a link pivotally connected at one end to said wedge and pivotally connected at its other end to said foot pedal.

MORRIS D. GOODRICH.